US012275536B2

(12) United States Patent
Hagshenas et al.

(10) Patent No.: US 12,275,536 B2
(45) Date of Patent: Apr. 15, 2025

(54) AIRCRAFT POWER SUPPLY ARRANGEMENTS

(71) Applicant: PRATT & WHITNEY CANADA CORP., Longueuil (CA)

(72) Inventors: Behzad Hagshenas, San Diego, CA (US); Serge Dussault, Ste-Julie (CA); Tim Sullivan, La Mesa, CA (US); Francois Belleville, Varennes (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 504 days.

(21) Appl. No.: 16/903,021

(22) Filed: Jun. 16, 2020

(65) Prior Publication Data
US 2021/0122487 A1    Apr. 29, 2021

Related U.S. Application Data

(60) Provisional application No. 62/925,365, filed on Oct. 24, 2019.

(51) Int. Cl.
*B64D 41/00* (2006.01)
*B64D 13/06* (2006.01)

(52) U.S. Cl.
CPC ............ *B64D 41/00* (2013.01); *B64D 13/06* (2013.01); *B64D 2013/0611* (2013.01); *B64D 2013/0644* (2013.01)

(58) Field of Classification Search
CPC .................... B64D 41/00; B64D 13/06; B64D 2013/0611; B64D 2013/0644
See application file for complete search history.

(56) References Cited

U.S. PATENT DOCUMENTS

| 5,722,229 A | 3/1998 | Provost |
| 10,450,074 B2* | 10/2019 | Stieger .................... F01D 15/10 |
| 11,059,593 B2* | 7/2021 | Fagundes ............... B64D 13/08 |

(Continued)

FOREIGN PATENT DOCUMENTS

| EP | 3412574 A1 * | 12/2018 | ............. B64D 13/06 |
| EP | 3623296 A1 * | 3/2020 | ............. B64D 13/06 |

(Continued)

*Primary Examiner* — Gordon A Jones
(74) *Attorney, Agent, or Firm* — NORTON ROSE FULBRIGHT CANADA LLP

(57) ABSTRACT

A power supply arrangement (PSA) for an aircraft having an electrical system and an environmental control system (ECS) operatively connected to a cabin of the aircraft, the PSA has: at least one propelling engine; a secondary power unit (SPU) having a rotary engine, at least one generator in driving engagement with the rotary engine and operatively connectable to the electrical system of the aircraft, and at least one load compressor operatively connected to the rotary engine and pneumatically connected to a pneumatic circuit connectable to the ECS of the aircraft, the PSA having a propelling configuration in which the at least one propelling engine and the SPU are both powered and a hotel configuration in which the at least one propelling engine is unpowered while the SPU is powered, the pneumatic circuit pneumatically disconnected from the at least one propelling engine in both of the hotel and propelling configurations.

20 Claims, 6 Drawing Sheets

(56) References Cited

U.S. PATENT DOCUMENTS

| | | | | |
|---|---|---|---|---|
| 11,313,273 | B2* | 4/2022 | Ullyott | F02B 53/02 |
| 2015/0246733 | A1* | 9/2015 | Silet | B64D 41/00 |
| | | | | 244/58 |
| 2016/0332736 | A1* | 11/2016 | Parmentier | F02C 9/18 |
| 2017/0284408 | A1* | 10/2017 | Ricordeau | F02C 7/32 |
| 2018/0037327 | A1* | 2/2018 | Hoffjann | B64D 41/00 |
| 2018/0134396 | A1* | 5/2018 | Blumer | F02C 6/08 |
| 2018/0141675 | A1* | 5/2018 | Halsey | H02J 7/34 |
| 2018/0346132 | A1* | 12/2018 | Casado-Montero | B64D 13/08 |
| 2019/0061957 | A1* | 2/2019 | Nicks | B64D 13/06 |
| 2019/0077514 | A1* | 3/2019 | Silet | B64D 13/02 |
| 2019/0263528 | A1* | 8/2019 | Casado-Montero | B64D 13/06 |
| 2020/0002059 | A1* | 1/2020 | Spiewok | B65D 33/01 |
| 2021/0179275 | A1* | 6/2021 | Zhu | B64D 13/06 |

FOREIGN PATENT DOCUMENTS

| | | | | |
|---|---|---|---|---|
| FR | 3025183 A1 * | 3/2016 | | B64C 13/06 |
| WO | WO-2011147977 A2 * | 12/2011 | | B60H 1/00 |
| WO | WO-2016156393 A1 * | 10/2016 | | B64D 13/06 |

* cited by examiner

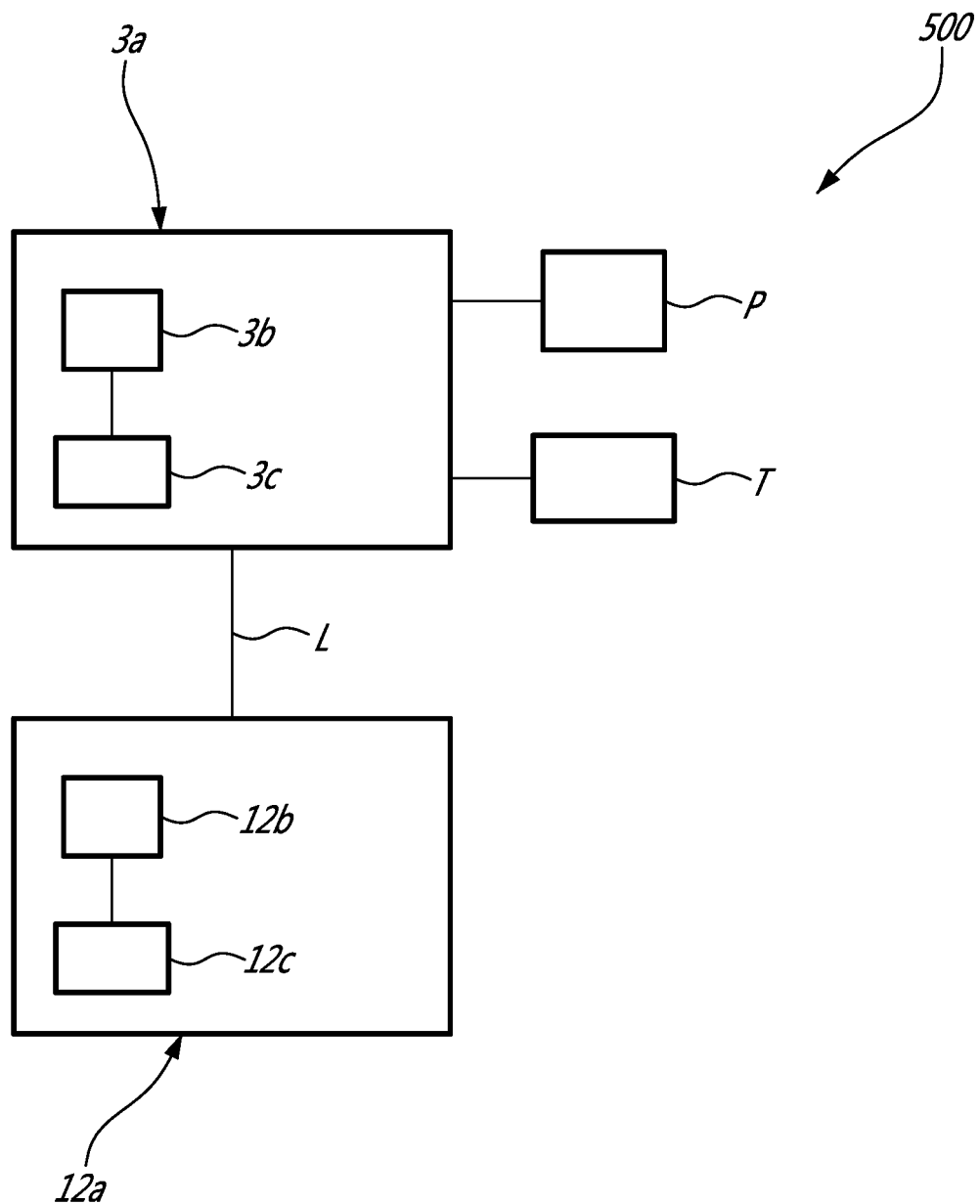

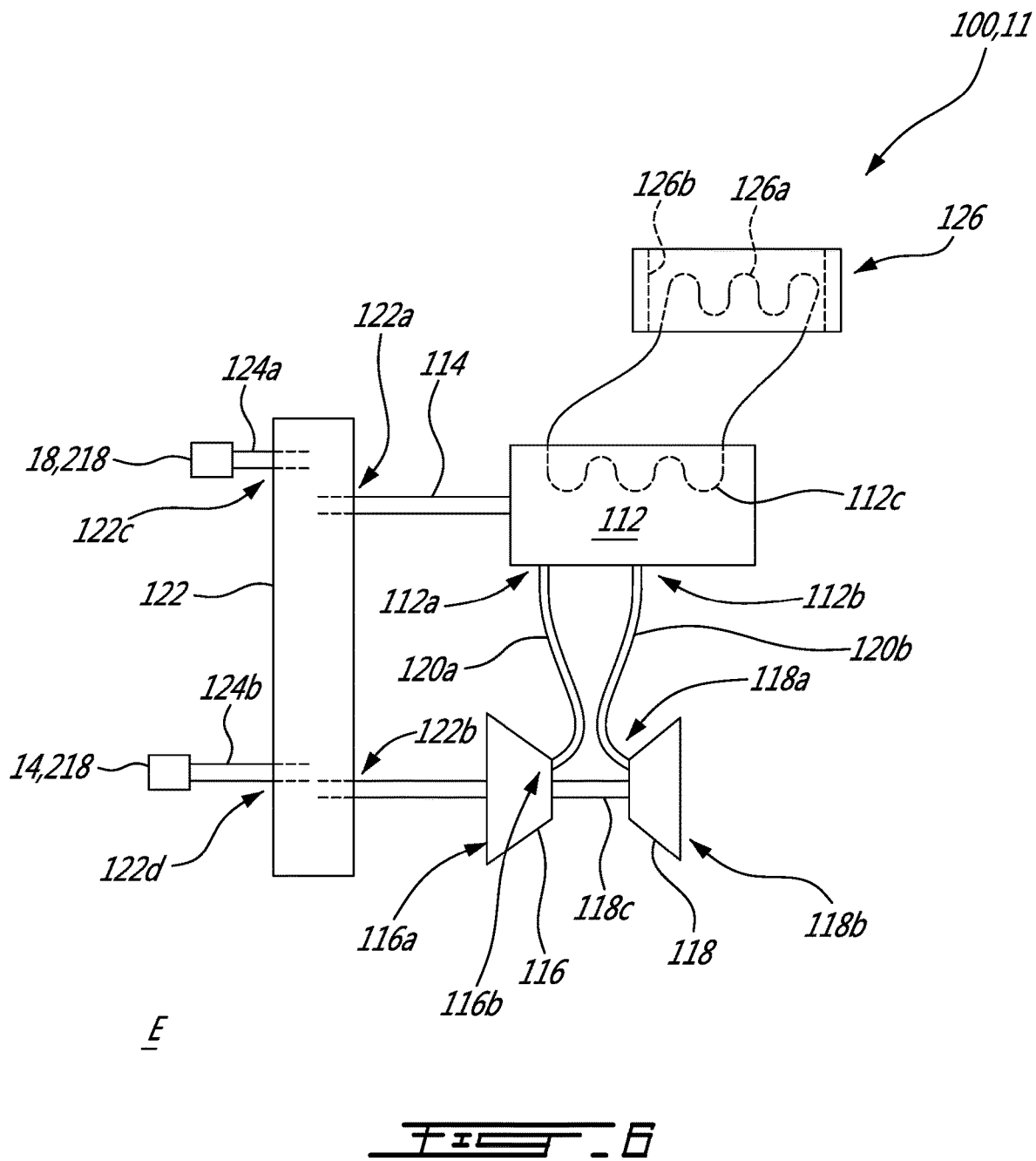

AIRCRAFT POWER SUPPLY ARRANGEMENTS

CROSS-REFERENCE TO RELATED APPLICATIONS

This application claims priority from U.S. patent application 62/925,365 filed on Oct. 24, 2019, the entire contents of which are incorporated by reference herein.

TECHNICAL FIELD

The application relates generally to aircraft power units and, more particularly, to systems and methods to provide compressed air to a cabin of the aircraft and to start engines of the aircraft.

BACKGROUND OF THE ART

Aircraft cabins are pressurized and temperature controlled by utilizing high pressure air supplied by an Auxiliary Power Unit (APU) or by propelling engines depending on if the propelling engines are unpowered or powered, respectively. This high pressure air is typically further conditioned through Environmental Control System (ECS) pack(s) and then distributed into the cabin.

SUMMARY

In one aspect, there is provided a power supply arrangement (PSA) for an aircraft having an electrical system and an environmental control system (ECS) operatively connected to a cabin of the aircraft, the PSA comprising: at least one propelling engine; a secondary power unit (SPU) having a rotary engine, at least one generator in driving engagement with the rotary engine and operatively connectable to the electrical system of the aircraft, and at least one load compressor operatively connected to the rotary engine and pneumatically connected to a pneumatic circuit connectable to the ECS of the aircraft, the PSA having a propelling configuration in which the at least one propelling engine and the SPU are both powered and a hotel configuration in which the at least one propelling engine is unpowered while the SPU is powered, the pneumatic circuit pneumatically disconnected from the at least one propelling engine in both of the hotel and propelling configurations.

In another aspect, there is provided a control system for a power supply arrangement of an aircraft having an environmental control system (ECS), at least one propelling engine, and a secondary power unit (SPU) operatively connected to at least one load compressor, the control system comprising: a processing unit and a computer-readable medium having instructions stored thereon executable by the processing unit for: obtaining data about air requirements of the ECS; determining operating parameters of the at least one load compressor in function of the obtained data; and operating the at least one load compressor with the SPU at the determined operating parameters to supply compressed air to the ECS whether the at least one propelling engine is powered or unpowered.

DESCRIPTION OF THE DRAWINGS

Reference is now made to the accompanying figures in which:

FIG. 5 is a schematic view of a control system in accordance with one embodiment that may be used with any of the secondary power units of FIGS. 2-4; and FIG. 6 is a schematic view of a turbo-compounded engine assembly in accordance with one embodiment.

DETAILED DESCRIPTION

Figure 1:
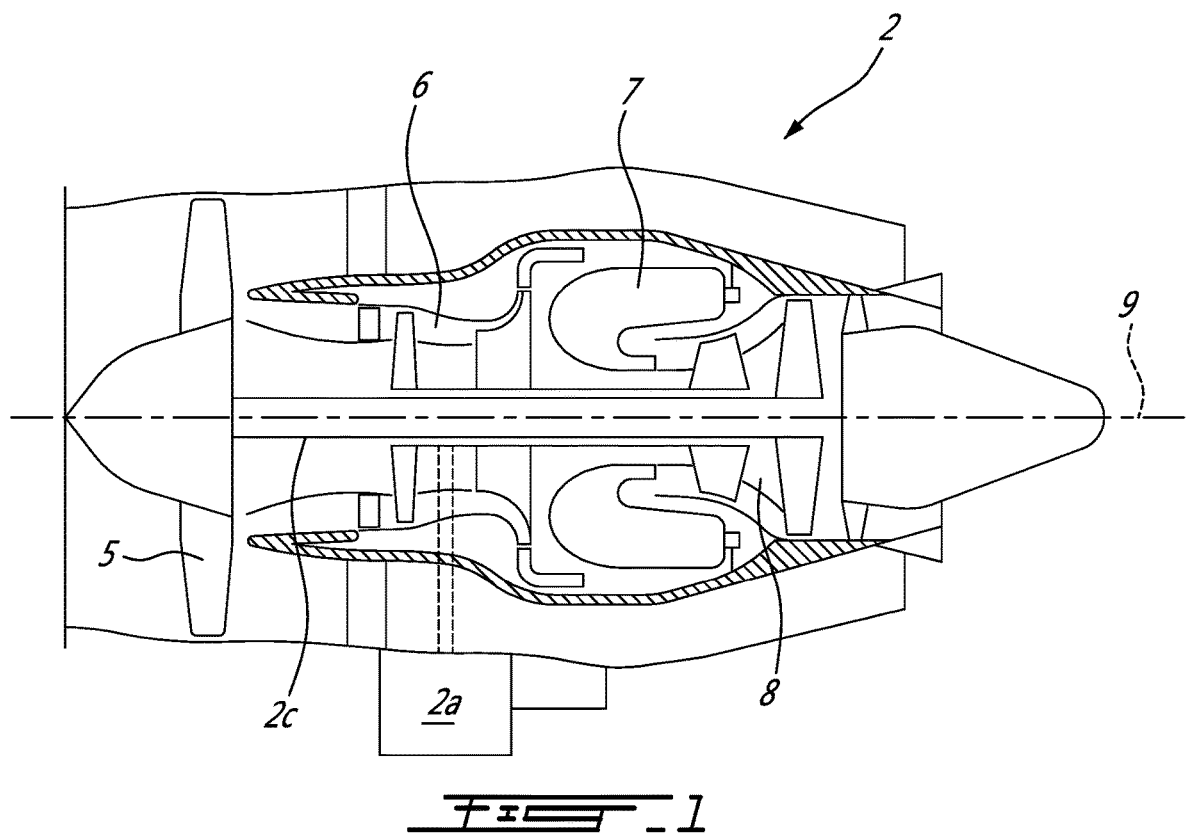
FIG. 1 is a schematic view of a gas turbine engine in accordance with one embodiment.

FIG. 1 illustrates a gas turbine engine 2 of a type preferably provided for use in subsonic flight, comprising in serial flow communication a fan 5 through which ambient air is propelled, a compressor section 6 for pressurizing the air, a combustor 7 in which the compressed air is mixed with fuel and ignited for generating an annular stream of hot combustion gases, and a turbine section 8 for extracting energy from the combustion gases. The fan 5, the compressor section 6, and the turbine section 8 are rotatable about a central axis 9 of the engine 2. Such a gas turbine engine 2 may be used as a propelling engine, also referred to as a prime mover engine.

Figure 1A:
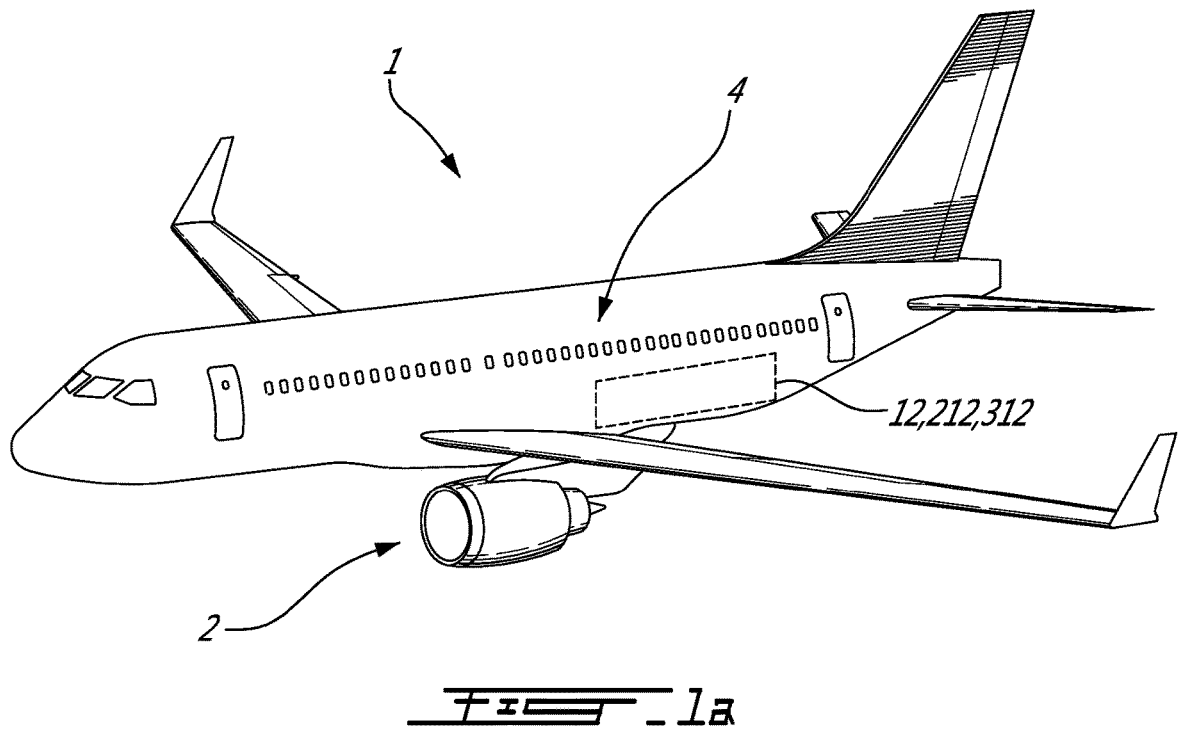
FIG. 1a is a schematic three dimensional view of an aircraft in accordance with one embodiment and that includes two (only one being visible) of the engines of FIG. 1.

Referring to FIGS. 1-1a, an aircraft 1 typically has one or more propelling engines, two of the engines 2 described above with reference to FIG. 1 in the present embodiment. These engines 2 are referred to as prime mover or propelling engines since they are used to make the aircraft 1 move. It is understood that the propelling engines may alternatively be turboprop engines or turboshaft engines. Any suitable engine may be used. Typically, the propelling engines 2 are used for propelling the aircraft 1, for providing pneumatic power to the aircraft 1, for instance by bleeding the compressor section 6, and for providing electrical power for the aircraft 1, for instance by having one of the shafts 2c of the engine 2 drivingly engaging a generator 2a. The pneumatic power is used, for instance, for pressurizing a cabin 4 of the aircraft 1 whereas the electrical power is used, for instance, for supplying electrical power to an electrical system of the aircraft for lighting the cabin and powering different systems of the aircraft. A traditional aircraft may be equipped with an auxiliary power unit (APU) used for providing the electrical and pneumatic power to the aircraft and for starting the propelling engines. For propelling engine start (MES), the APU air is diverted to the propelling engine air turbine starter if the propelling engines have pneumatic starters. On engines with electric starting systems, the APU is coupled to a generator to generate electrical power for MES. The APU may be a gas turbine engine of smaller dimension than that of the propelling engines 2. After the propelling engines are started, the APU is shut down and is not used for any of the flight phases (e.g., taxiing, take-off, climb, cruise, descent, landing). Therefore, the propelling engines are required to provide for propelling the aircraft 1 and for providing the electrical and pneumatic power for all remaining phases of the flight of the aircraft.

Figure 2:
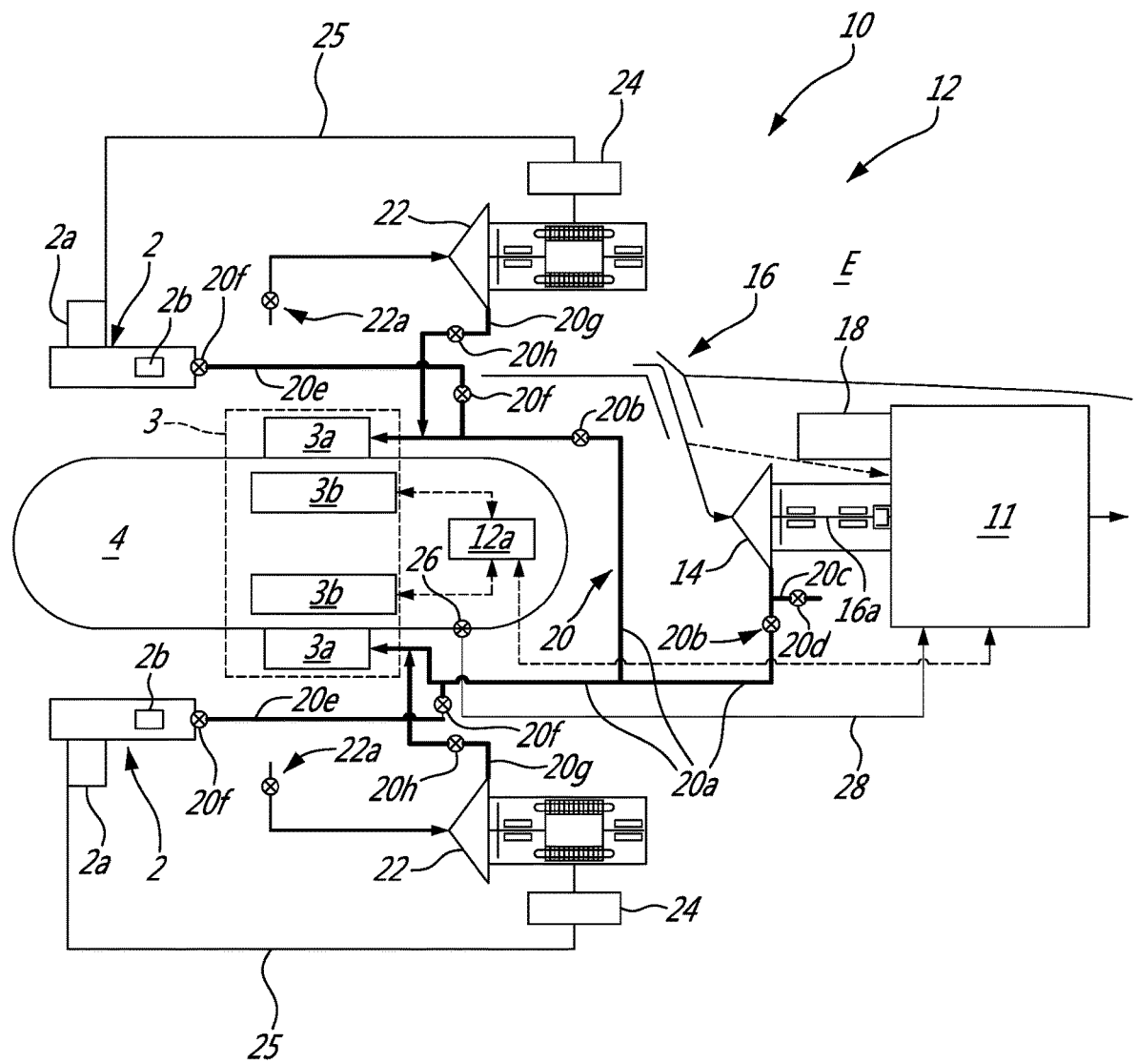
FIG. 2 is a schematic view of a power supply arrangement including a secondary power unit in accordance with one embodiment for an aircraft that includes two of the gas turbine engines of FIG. 1.

Referring more particularly to FIGS. 1a and 2, the aircraft 1 has an environmental control system 3 having one or more packs 3a, two in the embodiment shown, used for controlling a pressure and a temperature inside the cabin 4 of the aircraft 1. Typically, each of the ECS packs 3a comprises heat exchangers, turbo machinery referred to as Air Cycle Machine (ACM), valves, flow measuring devices, various sensors, controller and other equipment. Any suitable ECS pack known in the art may be used without departing from the scope of the present disclosure.

In some cases, the temperature of the air received by the ECS packs 3a is preferably at most at 500° F. The high pressure air supplied by the APU is typically always below 500° F. However, the high pressure air from the propelling engine compressor section 6 (FIG. 1) is provided typically through one of the two valves on the propelling engine compressor section 6 (FIG. 1). This air may sometimes be at a higher temperature than the 500° F. limit of the ECS packs 3a and therefore may need to pass through a propelling engine pre-cooler before being sent to the ECS packs 3a.

Traditionally, the ECS packs 3a are designed for optimum efficiency for one condition (i.e. 104° F. day ground condition). However, during other conditions (ground cooler days, cold days, or flight), the ECS packs 3a are receiving too high of air pressure with its associated temperature. In these other conditions, the heat of compression of the air may need to be expelled to an environment E outside the aircraft 1 through the heat exchangers (including the engine pre-cooler) and typically some or all of this air is throttled down and bypasses the packs 3a since not as much cooling may be required. Since the compression of air is associated with temperature rise, too much compression of air may require expelling the heat of compression. This may constitute a loss of energy as work carried by the compressors of the propelling engines to compress the air is lost by expelling the air overboard. During different conditions, for instance where the propelling engines are providing the high pressure air to the ECS packs 3a (e.g., during taxiing out, take-off, ascend, beginning of the cruise, end of the cruise, descend, landing, and taxiing in to the gate), the pressure being provided by the propelling engines for the ECS packs 3a may not be optimized.

Referring to FIGS. 1a-4, the aircraft 1 is free of an Auxiliary Power Unit and has a power supply arrangement (PSA) 10, 210, 310 that includes at least one propelling engine 2, a secondary power unit (SPU) 12, 212, 312, and a pneumatic circuit 20, 220 for pneumatically connecting the SPU 12, 212, 312 to the ECS packs 3a and, in some cases, to allow the SPU to pneumatically start the at least one propelling engine 2. More detail about the pneumatic circuit 20, 220 are presented below. A plurality of possible embodiments of PSAs and SPUs are described herein below with reference to FIGS. 2-4. The aircraft 1 may be equipped with any of those arrangements 10, 210, 310 and any of those units 12, 212, 312. The SPUS 12, 212, 312 include an engine assembly 11, which is described herein below with reference to FIG. 6. The engine assembly 11 is used to drive one or more load compressor 14 and/or one or more generators 18 as will be described herein below.

It will be appreciated that the PSA 10, 210, 310 of the aircraft 1 has a propelling configuration in which components (e.g., fan 12, compressor 14, turbine 18) of the propelling engines 2 are rotating and in which the propelling engines 2 are able to propel the aircraft 1. The PSA 10, 210, 310 has a hotel configuration in which the propelling engines 2 are unpowered. That is, in the hotel configuration, the components (e.g., fan 5, compressor 6, turbine 8) of the at least one propelling engine 2 are not rotating and the propelling engines 2 are not propelling the aircraft 1. However, in the hotel configuration, the PSA 10, 210, 310 is required to supply air to the ECS packs 3a to bring and/or maintain environment conditions inside the cabin 4 within acceptable level for passenger comforts. In the embodiment shown, the pneumatic circuit 20, 220, 320 of the PSA 10, 210, 310 is pneumatically disconnected from the at least one propelling engine 2 in both of the propelling and hotel configurations of the PSA. In other words, the ECS packs 3a do not receive compressed air from the compressor 6 of the propelling engines 2 neither in the propelling nor hotel configurations of the PSA 10, 210, 310. It will be appreciated that the SPU 12, 212, 312 is powered in both of the hotel and propelling configurations of the PSA 10, 210, 310. The propelling engine(s), in both of the hotel and propelling configurations, may be electrically disconnected from the electrical system of the aircraft 1 such that no electrical power is provided by the propelling engine(s). Electrical power requirements of the aircraft are catered to by the SPU 12, 212, 312. It is understood that some kind of connection (e.g., wireless, electrical, etc.) between the propelling engine(s) and the aircraft is present, for instance, to supply data to a cockpit of the aircraft regarding operating parameters of the propelling engine(s).

Referring to FIG. 6, an engine assembly 100, which is used as the engine assembly 11 of the SPUs 12 (FIG. 2), 212 (FIG. 3), and 312 (FIG. 4) is generally shown and includes an internal combustion engine 112. In the embodiment shown, the internal combustion engine 112 comprises one or more rotary units each configured for example as a Wankel engine. The engine 112 may alternatively include one or more reciprocating pistons. The internal combustion engine 112 is a rotary internal combustion engine. Any other suitable intermittent internal combustion engine, such as a piston engine, may be used without departing from the scope of the present disclosure.

Figure 3:
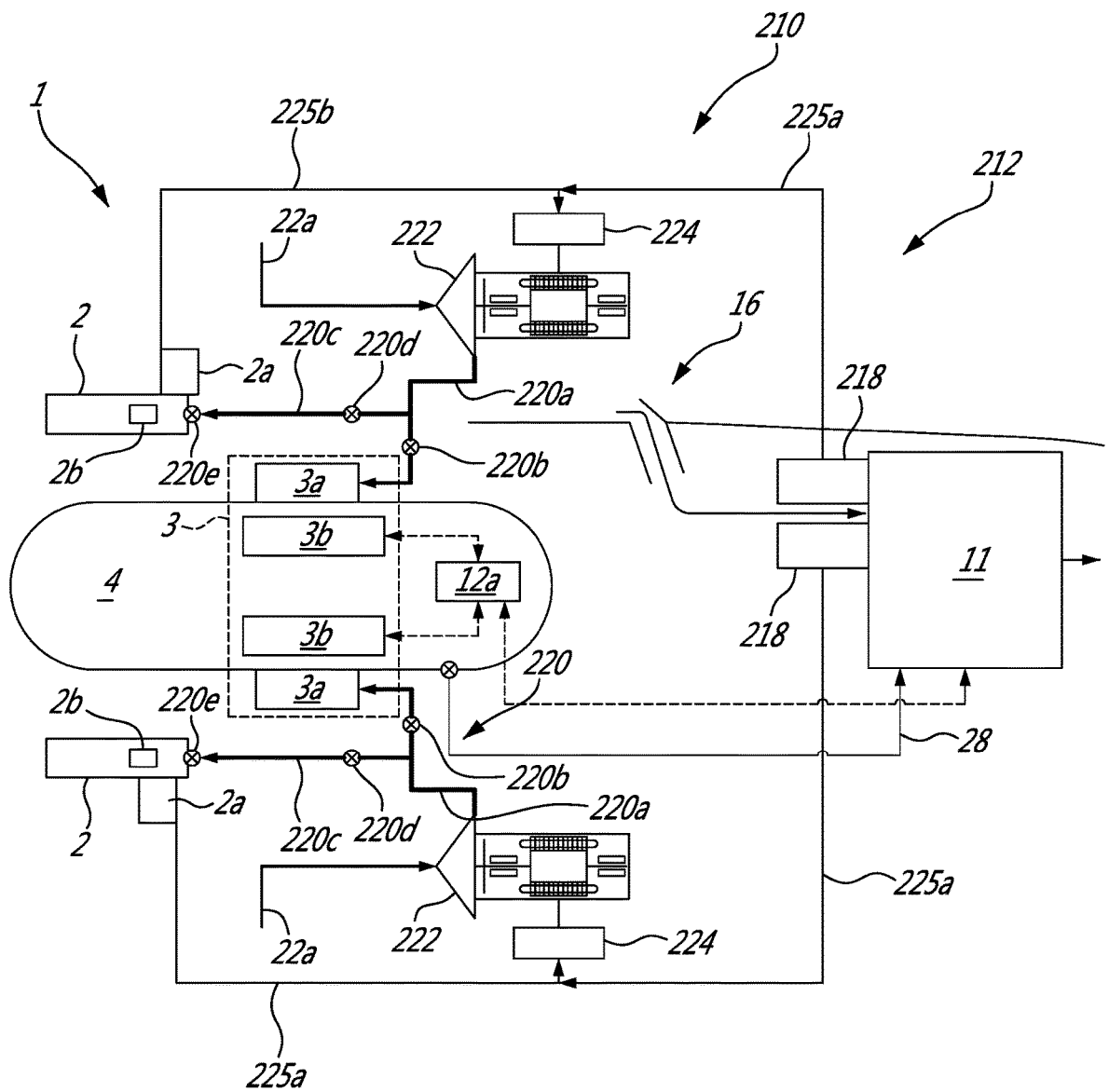
FIG. 3 is a schematic view of a power supply arrangement including a secondary power unit in accordance with another embodiment for an aircraft that includes two of the gas turbine engines of FIG. 1.
Figure 4:
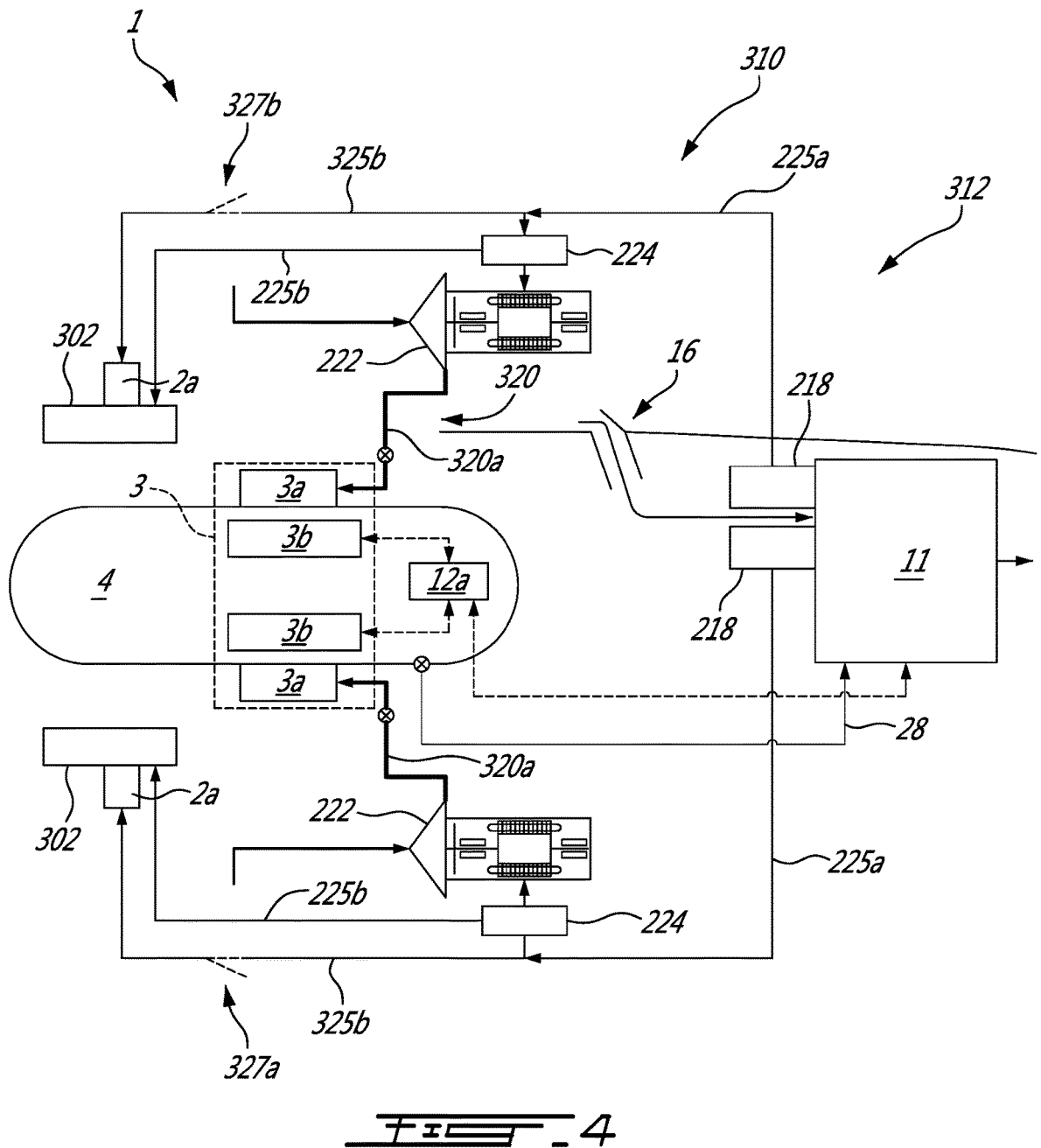
FIG. 4 is a schematic view of a power supply arrangement including a secondary power unit in accordance with another embodiment for an aircraft that includes two of the gas turbine engines of FIG. 1.

The internal combustion engine 112 drives a shaft 114 that is used for driving the generator(s) 18, 218 (FIGS. 2-4) and the load compressor 14 (FIGS. 2-4) and/or the motor drives 24, 224 (FIGS. 2-4). In a particular embodiment, the internal combustion engine 112 is a rotary engine comprising two rotary units each configured as a Wankel engine, with a rotor cavity having a profile defining lobes, preferably an epitrochoid, in which a rotor is received with the geometrical axis of the rotor being offset from and parallel to the axis of the rotor cavity, and with the rotor having three circumferentially-spaced apex portions and a generally triangular profile with outwardly arched sides, so as to define three rotating combustion chambers with variable volume.

In a particular embodiment, the engine assembly 100 is a compound cycle engine system or compound cycle engine such as described in Lents et al.'s U.S. Pat. No. 7,753,036 issued Jul. 13, 2010 or as described in Julien et al.'s U.S. Pat. No. 7,775,044 issued Aug. 17, 2010, or as described in Thomassin et al.'s U.S. patent publication No. 2015/0275749 published Oct. 1, 2015, or as described in Bolduc et al.'s U.S. patent publication No. 2015/0275756 published Oct. 1, 2015, the entire contents of all of which are incorporated by reference herein. The engine assembly 10 may be used as a prime mover engine, such as on an aircraft or other vehicle, or in any other suitable application.

In the embodiment shown, the engine assembly 100 includes a compressor 116 for compressing the air before it is fed to an air inlet 112a of the internal combustion engine 112 and a turbine section 118 receiving the exhaust gases from the internal combustion engine 112. It is understood that variations are possible, and that, for example, the compressor 116 and/or turbine section 118 may be omitted.

The compressor has a compressor inlet 116a fluidly connectable to the environment E outside the engine assembly (or to the cabin 4 as will be discussed below), also referred to herein as a source of ambient air, and a compressor outlet 116b fluidly connected to the air inlet 112a of the internal combustion engine 112 via a conduit 120a. The turbine section 118 includes a turbine inlet 118a fluidly connected to an exhaust 112b of the internal combustion engine 112 via a conduit 120b and a turbine outlet 118b fluidly connected to the environment E for expelling the exhaust gases generated by the internal combustion engine 112.

The internal combustion engine 112 provides an exhaust flow of high pressure hot gas exiting at high peak velocity, in the form of exhaust pulses. In the illustrated embodiment, the exhaust 112b of the internal combustion engine 112 (corresponding to or communicating with an exhaust port of a respective rotary engines/reciprocating pistons of the internal combustion engine 112) is in fluid communication with the turbine inlet 118a of the turbine section 118. Accordingly, the exhaust flow from the internal combustion engine 112 is supplied to the turbine section 118. The turbine section 118 may comprise a single turbine, or two or more turbine stages in serial fluid communication; the two or more turbine stages may have different reaction ratios from one another. Other configurations are contemplated.

In the illustrated embodiment, the engine assembly 100 includes a gearbox 122. The gearbox 122 has two inputs 122a, 122b and two outputs 122c, 122d. Each of the two inputs 122a, 122b is in driving engagement with a respective one of the engine shaft 114 and a turbine shaft 118c. Each of the two outputs 122c, 122d may be in driving engagement with a respective one of two output shafts 124a, 124b. The gearbox 122 is operable to combine the rotational inputs of both of the engine 112 and the turbine 118 to drive the two output shafts 124a, 124b. More specifically, the internal combustion engine 112, the compressor 116, and the turbine section 118 are in driving engagement with the gearbox 122. The gearbox 122 is operable to allow the turbine section 118 to compound power with the engine shaft 114 and to allow the turbine section 118 and/or the internal combustion engine 112 to drive one or both of the two output shafts 124a, 124b.

In the illustrated embodiment, the compressor 116 and the turbine section 118 are in a driving engagement with the gearbox 122. In the illustrated embodiment, the compressor and turbine rotors are engaged to the turbine shaft 118c which is drivingly engaged to the engine shaft 114 through the gearbox 122; the turbine shaft 118c and the engine shaft 114 are parallel and radially offset from one another. Alternate configurations are possible, including, but not limited to, the rotor(s) of the compressor 116 being engaged to a shaft separate from the turbine shaft 118c (whether coaxial with the turbine shaft 118c, with the engine shaft 114, or offset from both) and in driving engagement with the turbine shaft 118c and/or the engine shaft 114, for example through the gearbox 122; and/or two or more of the shafts 118c, 114 extending at an angle (perpendicularly or otherwise) to each other.

Still referring to FIG. 6, the internal combustion engine 112 is liquid cooled and includes a coolant circuitry 112c for flowing a liquid coolant. The engine assembly 100 includes a heat exchanger 126 for expelling heat from the liquid coolant to the environment E. The heat exchanger 126 includes at least one first conduit 126a and at least one second conduit 126b in heat exchange relationship with the at least one first conduit 126a. The at least one first conduit 126a is fluidly connected to the coolant circuitry 112c of the internal combustion engine 112. The at least one second conduit 126b is fluidly connected to the environment E for receiving a flow of cooling air from the environment E.

The heat exchanger 126 is used to provide heat exchange relationship between a lubricant circuit of the engine 112 and the air for cooling lubricant flowing within the lubricant circuit. The lubricant may be used, for instance, for lubricating bearings. In a rotary internal combustion engine, the lubricant is used for lubricating the faces of rotor(s) and for cooling down sealing faces of the rotor(s). The engine assembly 100 may include more than one heat exchanger each operable for transferring heat from a respective one of fluids (e.g., lubricant, liquid coolant) used by the engine to the environment E.

In use, heat generated by the combustion of fuel within combustion chambers of the internal combustion engine 112 is dissipated within a casing, or body, of the internal combustion engine 112. The heat is then transmitted from the body to the liquid coolant flowing within the coolant circuitry 112c before being transmitted from the liquid coolant to the flow of cooling air from the environment E via the heat exchange relationship between the at least one first conduit 126a and at least one second conduit 126b of the heat exchanger 126.

It will be appreciated that, alternatively, the engine assembly may be an electrical engine powered with battery and/or fuel cells, a gas turbine engine, a reciprocating engine, a rotary engine or any combinations of the above.

Referring back to FIG. 2, an embodiment of the PSA is shown generally at 10 and includes the SPU 12. The SPU 12 includes at least one load compressor 14 for providing pneumatic power to the aircraft 1 and at least one generator 18 for providing electrical power to the aircraft 1. The SPU 12 provides all the pneumatic and electric requirements of the aircraft 1 in all phases of the flight (e.g., taxiing, take-off, climb, cruise, descent, landing). In other words, the propelling engine(s) 2 of the aircraft 1 are pneumatically disconnected from the ECS packs 3a of the aircraft 1. Herein, the load compressor 14 and the generator 18 are drivingly engaged to the gearbox 122 (FIG. 6) of the engine assembly 11.

The SPU 12 is operable in normal conditions, which refer to conditions in which the SPU 12 is powered and able to provide the pneumatic and electrical power to the aircraft 1. The SPU may be in adverse conditions when the SPU 12 is defective and unable to carry its function of supplying the pneumatic and the electrical power of the aircraft 1. The PSA has a backup system able to take over the electrical and pneumatic power requirements of the aircraft 1 when the SPU 12 is in the adverse conditions. More detail about the backup system are presented below.

Still referring to FIG. 2, in the embodiment shown, the SPU 12 includes the engine assembly 11, a generator 18 in driving engagement with the engine assembly 11, and a load compressor 14 operatively connected to the rotary engine by being in driving engagement with the rotary engine of the engine assembly 11. The generator 18 is used for supplying electric power to the different systems, for instance lighting systems, of the aircraft 1 requiring electrical power. In the embodiment shown, in normal conditions, the SPU 12 with its generator 18 is the sole provider of the electrical power to the aircraft 1.

The load compressor 14 is pneumatically connected to a scoop or ram air inlet 16 to receive air from the environment E outside the aircraft 1. In the embodiment shown, the load compressor 14 is a centrifugal compressor including an impeller. Any other suitable type of compressor may be used. The impeller is mounted on a shaft 16a of the load compressor 14; the shaft 16a drivingly engaged to the engine assembly 11. Bearing(s) are used to rotationally support the shaft 16a. The load compressor may have more than one compressor stages, for instance two impellers disposed in series, and may include more than one compressor, for instance two similar compressors or two different compressors (e.g., axial and centrifugal).

In the embodiment shown, the load compressor 14 is mechanically coupled to the engine assembly 11. In the present case, a coupling between the load compressor 14 and the engine assembly 11 uses redundant sealing method. In the embodiment shown, a magnetic coupling is provided between the load compressor 14 and the engine assembly 11 for limiting lubricant from leaking in the air exiting the load compressor 14. In a particular embodiment, this limits lubricant smell in the cabin 4 of the aircraft 1. In other words, if mechanical coupling is used, the coupling uses redundant sealing method or a magnetic seal to minimize any oil smell in the cabin.

As shown in FIG. 2, the load compressor 14 is pneumatically connected to both of the ECS packs 3a via conduits 20a of the pneumatic circuit 20. Valves 20b are pneumatically connected to the conduits 20a and have open configurations in which fluid flow communication from the load compressor 14 to the to the ECS packs 3a is allowed and closed configurations in which the fluid flow communication form the load compressor 14 to the ECS packs 3a is limited. An outlet conduit 20c and an outlet valve 20d are pneumatically connected to the load compressor 14 and are used to allow some air to be ejected into the environment E if, for instance, the pressure is above a given threshold.

In the present case, the propelling engines 2 have pneumatic starters 2b pneumatically connectable to the load compressor 14 via conduits 20e. Valves 20f are pneumatically connected to the conduits 20e. The valves 20f have an open configuration in which fluid flow communication between the pneumatic starters 2b of the propelling engines 2 and the load compressor 14 is allowed and a closed configuration in which fluid flow communication between the pneumatic starters 2b of the propelling engines 2 and the load compressor 14 is limited.

In the embodiment shown, the backup system includes backup load compressors 22, two in the embodiment shown, which are used to generate the compressed air required by the ECS packs 3a when the SPU 12 is in the adverse conditions. Each of the two backup load compressors 22 is in driving engagement with a respective one of motor drives (e.g., electric motors) 24. The backup load compressors 22 are pneumatically connectable to the ECS packs 3a via suitable conduits 20g and valves 20h of the pneumatic circuit 20. The backup load compressors 22 use air drawn from the environment E via any suitable ram air scoop 22a. The valves 20h of the backup load compressors 22 have an open configuration in which the backup load compressors 22 are in fluid flow communication with the ECS packs 3a and a closed configuration in which the backup load compressor 22 are disconnected form the ECS packs 3a.

In the embodiment shown, each of the propelling engines 2 has a generator 2a drivingly engageable to the shaft 2c (FIG. 1) of the propelling engines 2. Each of the two generators 2a is electrically connected to a respective one of the motor drives 24. The generators 2a are selectively engaged and disengaged from the shafts 2c of the propelling engines 2 so as to be engaged solely when the SPU 12 is in the adverse conditions. A clutch may be used to selectively engage and disengage the generators 2a from the shafts 2c of the propelling engines 2.

The different component of the SPU 12 having been described, operation of the SPU 12 is explained herein below in both normal conditions and adverse conditions. In normal conditions, the engine assembly 11 of the SPU 12 drives both of the generator 18 and the load compressor 14. The valves 20b are in their open configurations allowing the compressed air generated by the load compressor 14 to reach the ECS packs 3a and the valves 20f are in their closed configurations. Electrical power generated by the generator 18 is distributed to the different electric systems of the aircraft 1.

When it is required to start the propelling engines 2, the air compressed by the load compressor 14 is directed to the propelling engines 2 to supply their respective pneumatic starters 2b by switching the valves 20f in their open configurations. Once the propelling engines 2 are started, the valves 20f are switched in their closed configurations and the air compressed by the load compressor 14 is directed to the ECS packs 3a for conditioning the air of the cabin 4.

In adverse conditions, that is, when the SPU 12 is non-operational and unable to be powered and to supply compressed air, redundancy is provided by allowing the backup load compressor 22 to supply the required compressed air to the ECS packs 3a. More specifically, in adverse conditions, the generators 2a of the propelling engines 2 are drivingly engaged to the shafts 2c of the propelling engines 2 and so that the generators 2a supply the motor drives 24 with electrical power via suitable links 25. The motor drives 24 then drivingly engages the backup load compressors 22. The valves 20h are switched in their open configurations thereby allowing fluid communication from the backup load compressors 22 to the ECS packs 3a. The vales 20b may be switched in their closed configuration to disconnect the load compressor 14 from the ECS packs 3a. The generator 18 may be electrically connected to the motor drives 24 via suitable connection for powering the motor drives 24. Powering the motor drives 24 with the generator 18 may be carried if, for instance, the load compressor 14 becomes non-operational while the engine assembly 11 is still operational.

The load compressor 14, in the embodiment shown, is the sole provider of compressed air to the ECS packs 3a in normal conditions. In other words, in the depicted configuration, the propelling engines 2 are not bled and do not provide compressed air to any system. Hence, substantially all of the air that enters the propelling engines 2 is used for propulsion. The compressors 6 of the propelling engines 2 are pneumatically disconnected from the ECS packs 3 at all time. In the embodiment shown, in all of the normal, starting, and adverse conditions, the compressors 6 of the propelling engines 2 remain disconnected from the ECS packs 3a. Hence, all of the air flowing through the propelling engines 2 is used for propulsion for all phases of a flight (e.g., taxiing, take-off, climb, cruise, descent, and landing).

Still referring to FIG. 2, a cabin outflow valve 26 of the pneumatic circuit 20 is connected to an aperture defined through a wall of the cabin 4. The cabin outflow valve 26 is used to allow air to exit the cabin 4. The cabin outflow valve(s) are utilized to regulate a pressure within the cabin 4 to an equivalent pressure of 8000 feet or less of altitude during flight. In the embodiment shown, the cabin outflow valve(s) 26 is/are pneumatically connected to engine assembly 11 via a suitable conduit 28. The air exiting the cabin 4 via the outflow valve 26 is used herein for a combustion process carried by the engine assembly 11. The air exiting the cabin 4 via the outflow valve 26 may be, depending of the altitude of the aircraft 1, at a pressure and temperature greater than that of the environment E. Therefore, the engine assembly 11, and hence the SPU 12, may have a greater efficiency compared to a configuration in which the engine assembly 11 uses air directly from the environment E for the combustion since the air pressure and temperature in the environment E may be less than that in the cabin 4. In other words, using the air from the cabin 4 being at a higher pressure than that of the environment E may require less work to be carried on the air before it is injected in combustion chamber(s) of the engine assembly 11.

Alternatively, the engine assembly 11 is connected to the scoop 16, as shown in dashed line in FIG. 2, to receive air directly from the environment E instead of via the cabin 4. It may offer a better efficiency to draw air from the cabin 4 than from the environment E because the air in the cabin 43 is at a higher pressure and temperature than that of the environment E depending of the altitude. It is understood that the system may include a switching valve allowing the SPUs to draw air from either the cabin 4 or the environment 1, or both in function of the operating conditions of the aircraft 1.

Referring now to FIG. 3, another embodiment of a power supply arrangement and of a secondary power unit re generally shown at 210 and 212, respectively. For the sake of conciseness, only elements that differ from the SPU 12 described herein above with reference to FIG. 1 are described herein below.

In the embodiment shown, the engine assembly 11 of the SPU 212 is in driving engagement with two generators 218. Herein, the two generators 218 are drivingly engaged to the gearbox 122 (FIG. 6) of the engine assembly 11. Other configurations are contemplated. Each of the two generators 218 is operatively connected to a respective one of two motor drives 224 via suitable links 225a, such as wires. Each of the two motor drives 224 is in driving engagement with a respective one of two compressors 222, which are herein referred as load/backup compressors 222. In the present embodiment, the two generators 218 of the SPU 212 provide the electric power to the other electric systems of the aircraft 1 as well as to provide electric power to the motor drives 224. It will be appreciated that another generator may be driving engaged to the engine assembly 11 for providing the electric power to the electric systems of the aircraft 1.

In the embodiment shown, the two load/backup compressors 222 have inlets pneumatically connected to the environment E via one or more ram air scoop(s) 22a. The load/backup compressors 222 are pneumatically connected to the ECS packs 3a via suitable first conduits 220a of the pneumatic circuit 220. Valves 220b are pneumatically connected on the first conduits 220a to selectively allow or block fluid flow communication between the load/backup compressors 222 and the ECS packs 3a. Second conduits 220c stems from the first conduits 220a from a location between the load/backup compressors 222 and the valves 220b and pneumatically connect the load/backup compressors 222 to the pneumatic starters 2b of the propelling engines 2. Valves 220d, 220e are pneumatically connected on the second conduits 220c and are operable to selectively allow or block fluid flow communication between the load/backup compressors 222 and the pneumatic starters 2b of the propelling engines 2.

In normal conditions, the generators 218 provide electric power to the motor drives 224 to drive the load/backup compressors 222, which supply compressed air to the ECS packs 3a. In other words, in normal conditions, the load/backup compressors 222 are pneumatically connected to the ECS packs 3a. When it is required to start the propelling engines 2, the load/backup compressors 222 are pneumatically connected to the pneumatic starters 2b and the air compressed by the load/backup compressors 222 is diverted toward the pneumatic starters 2b of the propelling engines 2. Once the propelling engines 2 are started, the load/backup compressors 222 are pneumatically connected to the ECS packs 3a to supply the compressed air to the ECS packs 3. The valves 220b, 220d, 220e are switched between their open and closed states depending on whether the backup/load compressors 222 supply compressed air to the pneumatic starters 2b or the ECS packs 3a.

In adverse conditions, that is when the SPU 212 is non-operational, the generators 2a of the propelling engines 2 are drivingly engaged to shafts 2c of the propelling engines 2. The generators 2a of the propelling engines 2 are operatively connected to the motor drives 224 via suitable links 225b. The generators 2a of the propelling engines 2 by being drivingly engaged by the shafts 2c of the propelling engines 2 generate electrical power, which is transmitted via the links 225b to the motor drives 224 to drive the load/backup compressors 222. The load/backup compressors 222 hence continue generating compressed air for the ECS packs 3a. Again, in this configuration of the SPU 212, and in both of the normal and adverse conditions, all of the air flowing through the propelling engines 2 is used for propulsion and not for feeding the ECS packs 3a.

Referring now to FIG. 4, another embodiment of a power supply arrangement and of a secondary power unit are generally shown at 310 and 312, respectively. For the sake of conciseness, only elements that differ from the SPU 212 described herein above with reference to FIG. 3 are described herein below.

In the embodiment shown, each of the generators 2a of the propelling engines 302 is operatively connected to a respective one of the generators 218 via links 325b. In the present embodiment, the links 325b stem from the links 225a that operatively connected the generators 218 to the motor drives 224. In the embodiment shown, the generators 2a of the propelling engines 302 are used as electric starters for starting the propelling engines 302. It will be appreciated that any suitable electrical connections between the generators 218 and the generators 2a of the propelling engines are contemplated.

As it is the case for the SPU 212 described above with FIG. 3, and in normal operating conditions, the engine assembly 11 drives the two generators 218 that provide electrical power to the motor drives 224 that drivingly engage the backup/load compressors 222. The backup/load compressors 222 are pneumatically connected to the ECS packs 3a via the conduits 320a of the pneumatic circuit 320 to supply compressed air to said packs 3a. The pneumatic circuit 320 of the PSA 310 of FIG. 4 differs from the circuit 220 of FIG. 3 in that there is no pneumatic connection to pneumatic starters since the propelling engines 302 have electric starters instead.

For starting the propelling engines 302, the engine assembly 11 drives the generators 218, which provide electric power to the generators 2a of the propelling engines 302 via the links 225a, 325b. The generators 2a of the propelling engines 302 are then operated as drive motor to provide rotation input to the shafts 2c of the propelling engines 302 to start the propelling engines 302. It will be appreciated that electrical switches 327a are connected on the links 325b to selectively electrically connect the generators 218 of the SPU 312 to the generators 2a of the propelling engines 302. The generators 2a of the propelling engines 302 thereby drive rotation of shafts 2c of the propelling engines 302 for starting. Once the propelling engines 302 are started, the generators 2a of the propelling engines 302 may be mechanically disengaged from the shafts 2c of the propelling engines 302 and the generators 218 of the SPU 312 may be electrically disconnected from said generators 2a. The generators 218 of the SPU 312 provide the electric power to the motor drives 224, which drive the load/backup compressors 222 as explained herein above with reference to FIG. 3. It will be appreciated that the generators 218 may provide electrical power simultaneously to both of the motor drives 224 and the engine generators 2a while starting the propelling engines 302.

As described above, and as it is the case with the secondary power unit 212 of FIG. 3, the secondary power unit 312 allows using electrical power generated by the generators 2a of the propelling engines 302 via the links 225b to power the motor drives 224 to drive the load/backup compressors 222 in the adverse conditions in which the SPU 212 is non-operational.

In all the embodiments described above, numerous parts such as flow control venturies, Ozone converter, humidifiers, valves, pressure and temperature sensors, contactors, other cooling circuits and so on are not illustrated, but may be present.

Referring now to FIG. 5, a control system for the aircraft 1 is generally shown at 500. The control system 500 includes the controllers 3a of the ECS packs 3 and the controller 12a of the SPU 12, 212, 312.

The controllers 3a of the ECS packs 3 each include a processing unit 3b and a computer readable medium 3c operatively connected to the processing unit 3b. In the embodiment shown, the controllers 3a of the ECS packs 3 are connected to a pressure sensor P and to a temperature sensor T; the pressure and temperature sensors P, T are located within the cabin 4 of the aircraft 1 for determining a temperature and a pressure of the air within the cabin 4. The controller 12a of the SPU 12 includes a processing unit 12b and a computer readable medium 12c operatively connected to the processing unit 12b. The computer readable medium 12c has instructions stored thereon and executable by the processing unit 12b for obtaining data about air requirements of the ECS 3; determining operating parameters of the at least one load compressor 14, 22, 222 in function of the obtained data; and operating the at least one load compressor 14, 22, 222 with the SPU 12, 212, 312 at the determined operating parameters to supply compressed air to the ECS 3 whether the at least one propelling engine 2, 302 is powered or unpowered.

In the embodiment shown, obtaining the data includes obtaining a target air pressure and a target air temperature of air within a cabin 4 of the aircraft 1. Driving the at least one load compressor 14 may include drivingly engaging the at least one load compressor 14 with a rotary engine 112 of the secondary power unit 12 or driving the load compressors 22, 222 with motor drives 24, 224 electrically connected to the generators 218 drivingly engaged to the rotary engine 112. Obtaining the data and determining the operating parameters of the at least one load compressor 14, 22, 222 may include periodically obtaining the data and determining the operating parameters during all flight phases of the aircraft 1. The control system 500 may be able to continuously adjust a mass flow rate and a temperature of compressed air outputted from the at least one load compressor 14, 22, 222 throughout all flight phases of the aircraft 1. Determining the operating parameters of the at least one load compressor 14, 22, 222 may include determining a rotational speed of the at least one compressor 14, 22, 222 and/or a geometry of the at least one load compressor 14, 22, 222. The geometry includes, for instance, angles of variable inlet guide vanes.

In the embodiment shown, the control system 500 is further able to receive a request to start the at least one propelling engine 2; and starts the at least one propelling engine with the SPU 12, 212, 312. Starting the at least one propelling engine 2 includes pneumatically driving a shaft 2c of the at least one propelling engine 2 with compressed air from the at least one load compressor 14, 22, 222 or electrically driving the shaft 2c of the at least one propelling engine 302 with electrical power generated by the at least one generator 218.

In the embodiment shown, the controller 500 is able to determine that the SPU 12, 212, 312 is in an adverse condition; and to power the at least one load compressor 22, 222 with the at least one propelling engine 2. Herein, the powering of the at least one load compressor 22, 222 includes: drivingly engaging the shaft 2c of the at least one propelling engine 2 to an engine generator 2a; and electrically powering, with the engine generator 2a, the motor drives 24, 224, which are in driving engagement with the load compressors 22, 222.

The load compressor and/or the load/backup compressor may have variable speed/variable geometry, such as variable inlet guide vane and/or variable diffuser vane to provide the optimum pressure required by ECS controller. The control system 500, more specifically the SPU controller 12a, may be operatively connected to said compressor(s) for varying the geometry to obtain the desired pressure/temperature at their outlet(s). The control system 500 is operatively connected to the valves 20d, 20f, 20h, 26, 220b, 220d, 220e to switch the valves between their open and closed configurations. In other words, the control system 500 controls opening of the valves 20d, 20f, 20h, 26, 220b, 220d, 220e to switch the SPU 12, 212, 312 from their normal operational modes, to their engine starting modes or their adverse situation modes.

In a particular embodiment, the disclosed secondary power units are able to provide on demand pneumatic and/or electric power at required rates, which may vary through a flight envelope. In other words, the disclosed SPUs can provide both of pneumatic and electrical power to the aircraft. In some cases, depending on flight conditions or overall system design, the SPUs provide only the pneumatic power; the electrical power being provided by the propelling engine(s). Consequently, the disclosed power supply may be more efficient than a classical APU configuration combined with bleeding of the compressor the propelling engines as the disclosed secondary power supply may provide only the power (electric and pneumatic) required by the aircraft, no more, no less.

In a particular embodiment, the SPU remains on during all phases of the flight, including cooling down before the propelling engines are started, starting the propelling engines, taxiing on the runway, take-off, climb, cruise, descent, landing, and taxiing on the runway to the gate. The disclosed power supply may take over the entirety of the pneumatic and/or electric requirements of the aircraft 1. As disclosed above, the aircraft 1 has redundancy allowing the propelling engines to supply the electric and/or pneumatic power to the aircraft 1 in case of failure of the SPU.

For supplying power to an aircraft with a secondary power unit (SPU), at least one generator is drivingly engaged with the SPU and electric power is provided to the aircraft with the at least one generator; air is compressed with at least one load compressor operatively connected to the SPU; and the compressed air is supplied to at least one environmental control system (ECS) pack of the aircraft.

The system utilizes a Secondary Power Unit (SPU) which is the sole provider of the power (pneumatic or electrical) required to run the ECS packs. The SPU may replace the traditional APU as well as the propelling engine to provide the pressurized air to run the ECS packs. Alternatively, the electrical power from the SPU may be supplied to run the dedicated load compressors (LC's) for the ECS packs or propelling engines electric starters.

The SPU power may directly drive a dedicated load compressor (mechanically or electrically). This dedicated load compressor may have variable speed coupled with variable geometry (variable inlet guide vanes and/or variable diffuser vanes) to provide the optimum pressure demanded by the ECS controller. Depending on the conditions (ground or flight, hot or cold days), the ECS controller communicates with the SPU controller through a closed loop control and always demands just the optimum amount of air pressure/flow (no more pressure/temperature than necessary).

Operating a typical APU in flight is not done because it would cost more in fuel to operate the APU than it would in operating the propelling engine at a higher power level for generating pneumatic/electrical power because the propelling engines 2 are more efficient than typical APU. This may not be the case for the SPUs disclosed herein using the rotary engine 112. An efficiency gain may be obtained by keeping the SPU on during all phases of a flight and keeping the propelling engines only for propelling and not for supplying electrical/pneumatic power to the aircraft 1. A further efficiency gain may be obtained using a turbo-compounded configuration described herein above with reference to FIG. 6 and in which the turbine 118 compounds power with the rotary engine 112 to drive the generators 18, 218 and, in some embodiments, the load compressor 14. The disclosed SPUS 12, 212, 312 may allow using propelling engines 2, 302 of smaller sizes compared to classical configurations in which the propelling engines are required to provide electrical, pneumatic, and propelling power to the aircraft 1. The propelling engines 2, 302 of the disclosed PSAs 10, 210, 310 are not used to provide pneumatic power from their compressors. This may allow weight savings compared to classical configurations in which the propelling engines are required to provide electrical power, pneumatic power by bleeding their compressors, and propelling power to the aircraft 1.

Embodiments disclosed herein include:
A. A power supply arrangement (PSA) for an aircraft having an electrical system and an environmental control system (ECS) operatively connected to a cabin of the aircraft, the PSA comprising: at least one propelling engine; a secondary power unit (SPU) having a rotary engine, at least one generator in driving engagement with the rotary engine and operatively connectable to the electrical system of the aircraft, and at least one load compressor operatively connected to the rotary engine and pneumatically connected to a pneumatic circuit connectable to the ECS of the aircraft, the PSA having a propelling configuration in which the at least one propelling engine and the SPU are both powered and a hotel configuration in which the at least one propelling engine is unpowered while the SPU is powered, the pneumatic circuit pneumatically disconnected from the at least one propelling engine in both of the hotel and propelling configurations.

B. A control system for a power supply arrangement of an aircraft having an environmental control system (ECS), at least one propelling engine, and a secondary power unit (SPU) operatively connected to at least one load compressor, the control system comprising: a processing unit and a computer-readable medium having instructions stored thereon executable by the processing unit for: obtaining data about air requirements of the ECS; determining operating parameters of the at least one load compressor in function of the obtained data; and operating the at least one load compressor with the SPU at the determined operating parameters to supply compressed air to the ECS whether the at least one propelling engine is powered or unpowered.

Embodiments A and B may include any of the following elements, in any combinations:

Element 1: the at least one load compressor is in driving engagement with the rotary engine. Element 2: at least one backup-load compressor and at least one motor drive in driving engagement with the at least one backup-load compressor, the SPU operable in a normal configuration in which the at least one load compressor is driven by the rotary engine and an adverse configuration in which the rotary engine is inoperative and in which the at least one backup-load compressor is driven by the at least one motor drive electrically connected to an engine generator of the at least one propelling engine. Element 3: the at least one backup-load compressor includes two backup-load compressors and the at least one electric motor includes two electric motors each drivingly engaged to a respective one of the two backup-load compressors. Element 4: at least one motor drive electrically connected to the at least one generator, the at least one load compressor in driving engagement with the at least one motor drive. Element 5: the at least one load compressor include two load compressors and wherein the at least one generator include two generators in driving engagement with the rotary engine, the SPU including two motor drives each electrically connected to a respective one of the two generators and in driving engagement with a respective one of the two load compressors. Element 6: the at least one propelling engine is operable in a starting configuration in which a pneumatic starter of the at least one propelling engine is pneumatically connected to the at least one load compressor via the pneumatic circuit. Element 7: the pneumatic circuit includes cabin outflow valve pneumatically connected to the cabin of the aircraft and to an engine air inlet of the rotary engine. Element 8: the rotary engine is part of an engine assembly including a compressor and a turbine in driving engagement with the compressor, the turbine having a turbine shaft in driving engagement with an engine shaft of the rotary engine for compounding power with the engine shaft. Element 9: the engine shaft and the turbine shaft are in driving engagement with a gearbox, the at least one generator drivingly engaged to the gearbox. Element 10: the obtaining the data includes obtaining a target air pressure and a target air temperature of air within a cabin of the aircraft.

Element 11: the driving the at least one load compressor includes drivingly engaging the at least one load compressor with a rotary engine of the secondary power unit or driving the at least one load compressor with a motor drive electrically connected to at least one generator drivingly engaged to the rotary engine. Element 12: the obtaining the data and the determining the operating parameters of the at least one load compressor includes periodically obtaining the data and determining the operating parameters during all flight phases of the aircraft. Element 13: the computer readable medium further has instructions stored thereon for continuously adjusting a mass flow rate and a temperature of compressed air outputted from the at least one load compressor throughout all flight phases of the aircraft. Element 14: the determining of the operating parameters of the at least one load compressor includes determining a rotational speed of the at least one compressor and/or a geometry of the at least one load compressor. Element 15: receiving a request to start the at least one propelling engine; and starting the at least one propelling engine with the SPU. Element 16: the starting the at least one propelling engine includes pneumatically driving a shaft of the at least one propelling engine with compressed air from the at least one load compressor or electrically driving the shaft of the at least one propelling engine with electrical power generated by the at least one generator. Element 17: determining that the SPU is in an adverse condition; and powering the at least one load compressor with the at least one propelling engine. Element 18: the powering of the at least one load compressor includes: drivingly engaging a shaft of the at least one propelling engine to an engine generator; and electrically powering at least one motor drive in driving engagement with the at least one load compressor.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A power supply arrangement (PSA) for an aircraft having an electrical system and an environmental control system (ECS) operatively connected to a cabin of the aircraft, the PSA comprising:
   at least one propelling engine;
   a backup system including at least one backup-load compressor pneumatically connected to the ECS of the aircraft;
   a secondary power unit (SPU) having a rotary engine, the rotary engine having at least one combustion chamber of varying volume, at least one generator in driving engagement with the rotary engine and operatively connectable to the electrical system of the aircraft, and at least one load compressor operatively connected to the rotary engine and pneumatically connected to a pneumatic circuit connectable to the ECS of the aircraft, the PSA having a propelling configuration in which the at least one propelling engine and the SPU are both powered and a hotel configuration in which the at least one propelling engine is unpowered while the SPU is powered, the pneumatic circuit pneumatically disconnected from the at least one propelling engine in both of the hotel and propelling configurations; and
   a controller having a processing unit operatively connected to a computer-readable medium having instructions stored thereon operable by the processing unit to:
      while the aircraft is in a cruise flight phase, operate the SPU in a normal configuration in which the at least one load compressor of the SPU provides compressed air to the ECS of the aircraft and in which the backup system is powered off,
      determine that the rotary engine is in an adverse configuration in which the rotary engine is powered off, and
      power on the backup system such that the back up system supplies compressed air to the ECS of the aircraft while the rotary engine is powered off.

2. The PSA of claim 1, wherein the at least one load compressor is in driving engagement with the rotary engine.

3. The PSA of claim 2, wherein the at least one backup-load compressor is drivingly engaged to at least one motor drive, the at least one motor drive electrically connected to an engine generator of the at least one propelling engine.

4. The PSA of claim 3, wherein the at least one backup-load compressor includes two backup-load compressors and the at least one electric motor includes two electric motors each drivingly engaged to a respective one of the two backup-load compressors.

5. The PSA of claim 1, comprising at least one motor drive electrically connected to the at least one generator, the at least one load compressor in driving engagement with the at least one motor drive.

6. The PSA of claim 5, wherein the at least one load compressor include two load compressors and wherein the at least one generator include two generators in driving engagement with the rotary engine, the SPU including two motor drives each electrically connected to a respective one of the two generators and in driving engagement with a respective one of the two load compressors.

7. The PSA of claim 1, wherein the at least one propelling engine is operable in a starting configuration in which a pneumatic starter of the at least one propelling engine is pneumatically connected to the at least one load compressor via the pneumatic circuit.

8. The PSA of claim 1, wherein the pneumatic circuit includes cabin outflow valve pneumatically connected to the cabin of the aircraft and to an engine air inlet of the rotary engine.

9. The PSA of claim 1, wherein the rotary engine is part of an engine assembly including a compressor and a turbine in driving engagement with the compressor, the turbine having a turbine shaft in driving engagement with an engine shaft of the rotary engine for compounding power with the engine shaft.

10. A control system for a power supply arrangement of an aircraft having an environmental control system (ECS), at least one propelling engine, and a secondary power unit (SPU) operatively connected to at least one load compressor, the control system comprising: a processing unit and a computer-readable medium having instructions stored thereon executable by the processing unit for:
   obtaining data about air requirements of the ECS;
   determining operating parameters of the at least one load compressor in function of the obtained data, the operating parameters including one or more of a geometry parameter of variable inlet guide vanes of the at least one load compressor and a rotational speed of the at least one load compressor;

in an adverse operating condition of the SPU in which the SPU is powered off and while the aircraft is in a cruise flight phase, providing the compressed air with a backup system including at least one backup-load compressor; and in a normal operating condition of the SPU and while the aircraft is in the cruise flight phase, maintaining the backup system powered off and operating the at least one load compressor with the SPU at the determined operating parameters to supply compressed air to the ECS whether the at least one propelling engine is powered or unpowered, the SPU having a rotary engine having at least one combustion chamber of varying volume.

11. The control system of claim 10, wherein the obtaining the data includes obtaining a target air pressure and a target air temperature of air within a cabin of the aircraft.

12. The control system of claim 10, wherein the driving the at least one load compressor includes drivingly engaging the at least one load compressor with the rotary engine of the secondary power unit or driving the at least one load compressor with a motor drive electrically connected to at least one generator drivingly engaged to the rotary engine.

13. The control system of claim 10, wherein the obtaining the data and the determining the operating parameters of the at least one load compressor includes periodically obtaining the data and determining the operating parameters during all flight phases of the aircraft.

14. The control system of claim 13, wherein the computer readable medium further has instructions stored thereon for continuously adjusting a mass flow rate and a temperature of compressed air outputted from the at least one load compressor throughout all flight phases of the aircraft.

15. The control system of claim 10, wherein the determining of the operating parameters of the at least one load compressor includes determining a rotational speed of the at least one compressor and/or a geometry of the at least one load compressor.

16. The control system of claim 10, comprising:
receiving a request to start the at least one propelling engine; and
starting the at least one propelling engine with the SPU.

17. The control system of claim 16, wherein the starting the at least one propelling engine includes pneumatically driving a shaft of the at least one propelling engine with compressed air from the at least one load compressor or electrically driving the shaft of the at least one propelling engine with electrical power generated by the at least one generator.

18. The control system of claim 10, comprising:
determining that the SPU is in an adverse condition; and
powering the at least one load compressor with the at least one propelling engine.

19. The control system of claim 18, wherein the powering of the at least one load compressor includes:
drivingly engaging a shaft of the at least one propelling engine to an engine generator; and
electrically powering at least one motor drive in driving engagement with the at least one load compressor with the engine generator.

20. A power supply arrangement (PSA) for an aircraft having an electrical system and an environmental control system (ECS) operatively connected to a cabin of the aircraft, the PSA comprising:
at least one propelling engine;
a backup system including at least one backup-load compressor pneumatically connected to the ECS of the aircraft;
a secondary power unit (SPU) having an electrical motor powered by a fuel cell, at least one generator in driving engagement with the electrical motor and operatively connectable to the electrical system of the aircraft, and at least one load compressor operatively connected to the electrical motor and pneumatically connected to a pneumatic circuit connectable to the ECS of the aircraft, the PSA having a propelling configuration in which the at least one propelling engine and the SPU are both powered and a hotel configuration in which the at least one propelling engine is unpowered while the SPU is powered, the pneumatic circuit pneumatically disconnected from the at least one propelling engine in both of the hotel and propelling configurations; and
a controller having a processing unit operatively connected to a computer-readable medium having instructions stored thereon operable by the processing unit to:
while the aircraft is in a cruise flight phase, operate the SPU in a normal configuration in which the at least one load compressor of the SPU provides compressed air to the ECS of the aircraft and in which the backup system is powered off,
determine that the rotary engine is in an adverse configuration in which the rotary engine is powered off, and
power on the backup system such that the back up system supplies compressed air to the ECS of the aircraft while the rotary engine is powered off.

* * * * *